Dec. 30, 1930.  T. M. LAWSON  1,787,156
USED JOURNAL BOX WASTE CLEANING MACHINE
Filed June 17, 1929   2 Sheets-Sheet 1
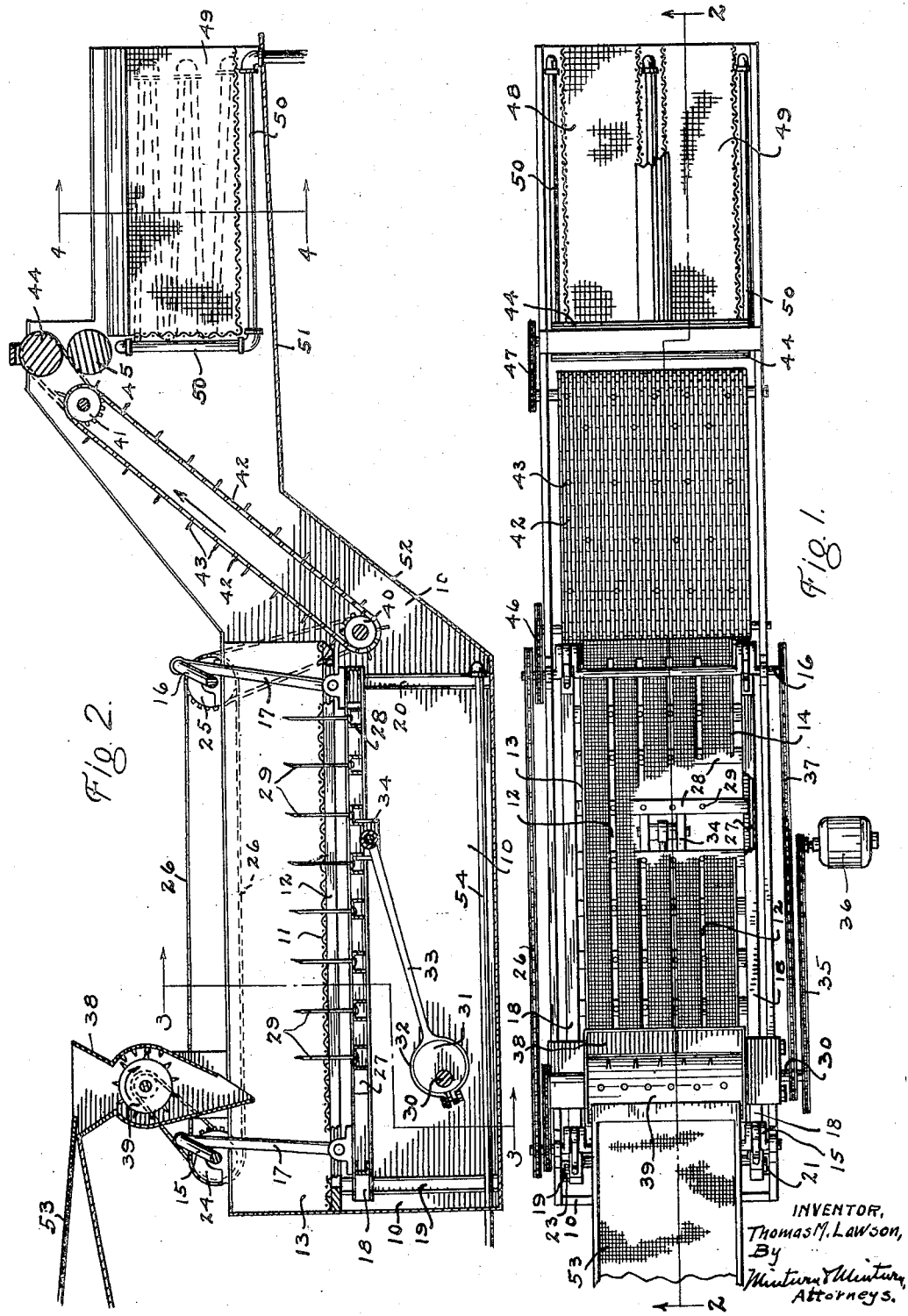

INVENTOR,
Thomas M. Lawson,
By Minturn & Minturn,
Attorneys.

Patented Dec. 30, 1930

1,787,156

UNITED STATES PATENT OFFICE

THOMAS M. LAWSON, OF INDIANAPOLIS, INDIANA

USED JOURNAL-BOX-WASTE CLEANING MACHINE

Application filed June 17, 1929. Serial No. 371,328.

This invention relates to the art of reclaiming used journal-box waste, and particularly to means for washing the waste.

The primary objects of the invention are to provide means which may be economically operated; which will loosen up and separate a compact mass of dirty waste; that will remove the gummy and congealed greases with the accompanying foreign matter such as cinders, Babbitt metal and the like; and that will remove moisture from the waste. These and other objects will become apparent in the following description of the one particular form of the invention as now best known to me as shown by the accompanying drawings, in which—

Fig. 1 is a top plan view of a machine embodying my invention;

Fig. 2, is a vertical longitudinal section on the line 2—2 in Fig. 1;

Figure 3:
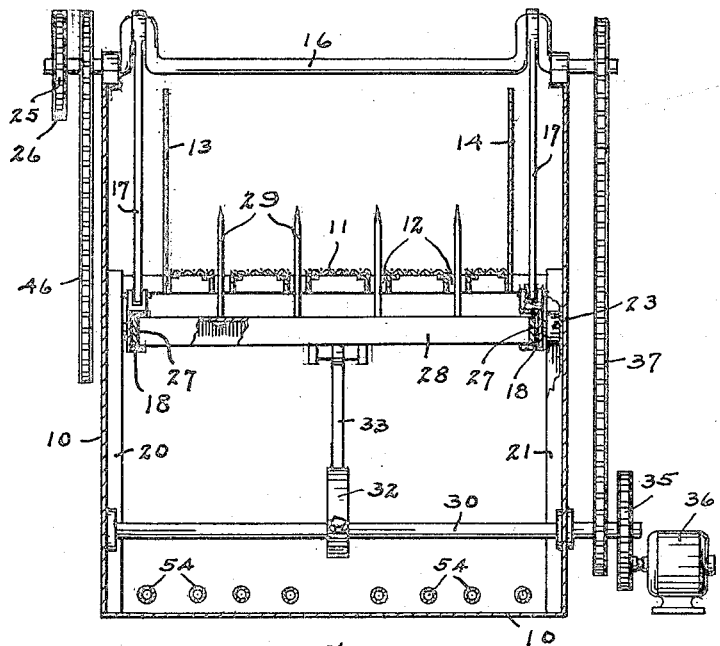

Fig. 3, a transverse section on the line 3—3 in Fig. 2; and

Figure 4:
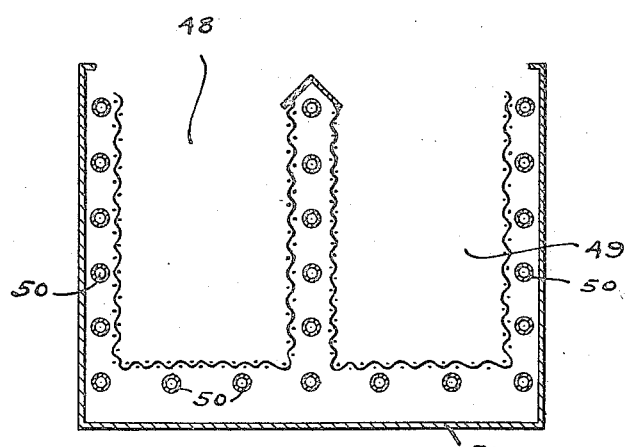

Fig. 4, a transverse vertical section on the line 4—4 in Fig. 2.

Like characters of reference indicate like parts throughout the several views in the drawings.

I form an oil containing tank 10, transversely across which I mount a partitioning screen 11 with a plurality of longitudinal slot-like openings 12 therethrough, here shown as four in number. This screen does not extend to the side walls of the tank 10 but terminates at a distance from each side and has the side walls 13 and 14 projecting vertically thereabove.

At each end of the tank, I revolvably support the crank shafts 15 and 16 transversely thereacross.

Each of these shafts has a throw immediately above the space between the side walls of the tank 10 and the partition walls 13 and 14 at the sides of the screen 11. From each of these throws is pivotally suspended links 17 which pivotally engage by their lower ends in brackets mounted on each of the four corners of a rectangular frame 18 here shown as being formed from channel bars.

Vertical guides 19, 20, and 21 are fixed to the side walls of the tank 10 on the opposite sides respectively of the frame 18 and a roller 23 rotatably carried at each corner of the frame projects to within these guides so that upon rotation of the shafts 15 and 16 the frame may be lowered and raised vertically and may not travel horizontally. Sprocket wheels 24 and 25 of the same diameter are fixed on the outer ends of the shafts 15 and 16 and a chain 26 is passed around these sprockets so that both shafts 15 and 16 must revolve equal distances upon either one being rotated.

The two longitudinal side rails of the frame 18 have their respective legs projecting toward each other between which a bar 27 is slidingly engaged on each side. The two bars 27, 27 are tied together by the transverse members 28, here shown as eight in number, whereby the entire unit may slide between the side rails of the frame 18. A plurality of upwardly projecting fingers 29 are secured to each of the cross members 28 to have the fingers arranged in longitudinal rows adapted to project freely through the slots 12 in the screen 11.

Toward the bottom of the tank 10 I mount a transverse shaft 30 and secure thereon an eccentric 31 having therearound the strap 32 from which extends the connecting rod 33 to pivotally engage with the bracket 34 suspended from between two of the cross members 28.

The shaft 30 projects through the wall of the tank 10 and carries thereon a sprocket wheel about which the chain 35 passes from the motor 36. A chain drive 37 also operates from the shaft 30 to drive the crank shaft 16, Figs. 1 and 3.

At one end of the tank 10, I mount a picker 38 thereabove driven from the crank shaft 15. This picker consists essentially of a revolvable cylinder 39 having teeth projecting therefrom adapted to pass between stationary teeth held on the side wall of the housing therearound. At the opposite end of the tank 10, I provide a conveyer comprising a lower roller 40, the upper roller 41, and a chain link belt 42 passed therearound with a plurality of teeth 43 projecting outwardly therefrom.

The lower roller 40 is positioned under the end of the screen 11 and the upper roller 41 is positioned just behind the wringer rolls 44 and 45. The roll 40 is here shown as being driven from the shaft 16 by the chain 46 and the wringer roll 44 is shown as being driven by the chain 47 from the roll 41.

Immediately under the wringer rolls 44 and 45 is located a receiving hopper which consists of the two separate compartments 48 and 49 having a screen bottom, a screen rear wall and screen side walls with the front wall entirely open. Steam piping 50 is passed under each of these compartments between them and behind their rear walls. A platform 51 is provided below the steam piping and is sloped rearwardly back toward the tank 10 to join with an upwardly and forwardly sloped wall 52 under the conveyer.

In cleaning the used journal-box waste, the waste as it is received is first placed on the screen platform 53 where it is sorted by hand to have the coarser foreign objects such as stones and the like removed therefrom.

From the platform 53 the waste is passed through the picker 38 to mechanically separate it, and from the picker the waste discharges into the tank 10 onto the screen 11 between the partitions 13 and 14. In practice, the waste may discharge from the picker 38 into a soaking tank (not shown) from which the waste is then brought and placed in the tank 10. The tank 10 has previously been supplied with a sufficient volume of lubricating oil to have its level well above the screen 11. This oil is heated by the steam piping 54 and is maintained at a temperature ranging from 170 degrees Farenheit to 212 degrees.

The motor 36 is set in operation whereby the eccentric 31 will reciprocate the fingers 29 longitudinally to carry the waste deposited thereabove backward and forwardly accordingly. At the same time, the shafts 15 and 16 are being revolved to raise and lower the fingers 29 into and out of contact with the waste. The rate of rotation of the shafts 15 and 16 is timed in relation to the rotation of the eccentric 31 by suitable differences in sprocket sizes between the various shafts, so that the fingers 29 are reciprocated a number of times while in contact with the waste before the fingers are dropped down out of contact therewith and also so that as the fingers 29 are raised and lowered, they will carry the waste forwardly a distance upon each lowering thereof to cause the waste to gradually discharge from off the screen 11 onto the conveyer belt 42.

The waste is carried up the conveyer and discharged between the wringer rolls where much of the oil is pressed out and allowed to fall back into the tank 10. From these rolls the waste drops into the compartments 48 and 49 and is allowed to remain there from three to sixteen hours subject to the heat from the piping 50.

The waste goes through a sweat during this time during which action all moisture is driven out. This sweating process also causes the elimination of practically all of the oil remaining in the waste. At the conclusion of the sweating, the waste is taken from these compartments and then impregnated with clean lubricating oil, after which the waste is ready for use.

I claim:

1. In a used journal-box waste reclaiming machine, a tank, a transverse floor across the tank having openings therethrough, fingers carried below the floor, and means for raising and lowering said fingers through said openings, a waste sweating compartment having a perforate bottom, heating means about said compartment, a drain floor below said compartment, means for transferring the waste from said tank to said compartment, and said drain floor sloping back to said tank to drain oil thereto coming through the perforate bottom.

2. In a used journal-box waste reclaiming machine, an oil containing tank, a horizontal screen supported in the tank in a fixed manner, said screen having longitudinal slots, a frame below the screen formed from channel bars with inturned legs, vertical guides formed from channel bars, rollers on the frame entering the channels of the guides, a pair of bars slidably assembled in the channels of the frame, a plurality of transverse members uniting the pair of bars, a plurality of fingers seated in the transverse members and projecting upward into the longitudinal slots of the screen, means for raising and lowering the transverse members to raise and lower the fingers and means for reciprocating the transverse members to correspondingly move the fingers.

3. In a used journal-box waste reclaiming machine, an oil containing tank, a horizontal screen supported in the tank in a fixed manner, said screen having longitudinal slots, a frame below the screen formed from channel bars with inturned legs, vertical guides formed from channel bars, rollers on the frame entering the channels of the guides, a pair of bars slidably assembled in the channels of the frame, a plurality of transverse members uniting the pair of bars, a plurality of fingers seated in the transverse members and projecting upward into the longitudinal slots of the screen, means for raising and lowering the transverse members to raise and lower the fingers and means for reciprocating the transverse members to correspondingly move the fingers and means for synchronizing said reciprocating action with said raising and lowering action.

4. In a device for reclaiming used journal box waste, means for agitating and separating the fibers of the waste in the presence of a body of oil, a waste sweating compartment having a drain therefrom back to said body of oil, and means for transferring the waste from said first means to said compartment.

In testimony whereof I affix my signature.

THOMAS M. LAWSON.